(12) United States Patent
Kolan et al.

(10) Patent No.: US 11,204,859 B2
(45) Date of Patent: Dec. 21, 2021

(54) PARTIAL-RESULTS POST-SILICON HARDWARE EXERCISER

(71) Applicant: International Business Machines Corporation, Armonk, NY (US)

(72) Inventors: Tom Kolan, Haifa (IL); Alex Lvovsky, Kiriat Motzkin (IL); Hillel Mendelson, Kibbutz Hahotrim (IL); Vitali Sokhin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 16/505,744

(22) Filed: Jul. 9, 2019

(65) Prior Publication Data

US 2021/0011838 A1   Jan. 14, 2021

(51) Int. Cl.

| G06F 11/36 | (2006.01) |
|---|---|
| G06F 9/30 | (2018.01) |
| G06F 11/263 | (2006.01) |
| G06F 16/903 | (2019.01) |
| G06F 12/1081 | (2016.01) |
| G06F 9/38 | (2018.01) |
| G06F 9/32 | (2018.01) |

(52) U.S. Cl.
CPC ...... *G06F 11/3684* (2013.01); *G06F 9/30043* (2013.01); *G06F 9/327* (2013.01); *G06F 9/3877* (2013.01); *G06F 11/263* (2013.01); *G06F 12/1081* (2013.01); *G06F 16/903* (2019.01)

(58) Field of Classification Search
CPC ............. G06F 11/3684; G06F 9/30043; G06F 11/263; G06F 16/903; G06F 12/1081; G06F 9/3877; G06F 9/327; G06F 11/2635; G06F 2212/654
See application file for complete search history.

(56) References Cited

U.S. PATENT DOCUMENTS

| 5,202,889 A | * | 4/1993 | Aharon | G01R 31/31704 714/736 |
|---|---|---|---|---|
| 5,572,666 A | * | 11/1996 | Whitman | G01R 31/318307 714/32 |
| 5,740,353 A | * | 4/1998 | Kreulen | G06F 11/263 714/33 |

(Continued)

OTHER PUBLICATIONS

Cong et al, Coverage Evaluation of Post-silicon Validation Tests with Virtual Prototypes, Department of Computer Science, Portland State University, Portland, OR 97207, USA {congkai, leil, zhenkun, xie}@cs.pdx.edu. 2014. P 1-6.

*Primary Examiner* — Stacy Whitmore
(74) *Attorney, Agent, or Firm* — Gassner Intellectual Property

(57) ABSTRACT

A method for testing an integrated circuit, comprising: accessing a database associated with a test template, wherein said test template is configured to test a selected function of the integrated circuit; storing, in said database, data corresponding to at least partial predicted results of one or more random instruction sequences generated based on said test template; generating, by an automated test generation tool, a random instruction sequence based on said test template; executing said instruction sequence by a hardware exerciser, in the integrated circuit; and comparing results of said instruction sequence with said at least partial predicted results, to verify a function of said integrated circuit.

15 Claims, 2 Drawing Sheets

(56) References Cited

U.S. PATENT DOCUMENTS

| | | | | |
|---|---|---|---|---|
| 6,606,721 | B1* | 8/2003 | Gowin, Jr. | G01R 31/318385 |
| | | | | 714/728 |
| 7,103,812 | B1* | 9/2006 | Thompson | G06F 11/261 |
| | | | | 703/13 |
| 8,397,217 | B2* | 3/2013 | Goryachev | G06F 8/70 |
| | | | | 717/124 |
| 9,626,267 | B2* | 4/2017 | Park | G06F 11/263 |
| 10,223,225 | B2* | 3/2019 | Dusanapudi | G06F 11/263 |
| 10,838,729 | B1* | 11/2020 | Al-Otoom | G06F 9/3838 |
| 10,970,196 | B1* | 4/2021 | Goel | G06F 11/3684 |
| 2013/0311164 | A1* | 11/2013 | Katz | G06F 11/3652 |
| | | | | 703/28 |
| 2014/0032969 | A1* | 1/2014 | Landa | G06F 11/263 |
| | | | | 714/33 |
| 2014/0089737 | A1* | 3/2014 | Ethiraj | G06F 11/263 |
| | | | | 714/32 |
| 2016/0162381 | A1 | 6/2016 | Hendrickson et al. | |
| 2017/0212818 | A1* | 7/2017 | Kapoor | G06F 11/263 |
| 2018/0157574 | A1 | 6/2018 | Mitra et al. | |
| 2019/0311072 | A1* | 10/2019 | Schieve | G06F 30/33 |
| 2020/0371887 | A1* | 11/2020 | Dalton | G06F 11/263 |
| 2021/0049015 | A1* | 2/2021 | Chou | G06F 9/3832 |
| 2021/0089318 | A1* | 3/2021 | Liu | G06F 9/3834 |

\* cited by examiner

PARTIAL-RESULTS POST-SILICON HARDWARE EXERCISER

BACKGROUND

The invention relates to the field of semiconductor integrated circuit testing.

An "exerciser" is a program designed to run on a processor of a system-under-test, or on a software simulator or a hardware emulator of the system-under-test, with the object of testing for "bugs" on the processor or its environment. That is, the exerciser may explore the functionality of the system-under-test and verify whether it performs according to its design specification, with the object of identifying cases of erroneous behavior.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method for testing an integrated circuit, comprising: accessing a database associated with a test template, wherein said test template is configured to test a selected function of the integrated circuit; storing, in said database, data corresponding to at least partial predicted results of one or more random instruction sequences generated based on said test template; generating, by an automated test generation tool, a random instruction sequence based on said test template; executing said instruction sequence by a hardware exerciser, in the integrated circuit; and comparing results of said instruction sequence with said at least partial predicted results, to verify a function of said integrated circuit.

There is also provided, in an embodiment, a system for testing an integrated circuit, comprising at least one hardware processor; and a non-transitory computer-readable storage medium having stored thereon program instructions, the program instructions executable by the at least one hardware processor to: access a database associated with a test template, wherein said test template is configured to test a selected function of the integrated circuit, store, in said database, data corresponding to at least partial predicted results of one or more random instruction sequences generated based on said test template, generate, by an automated test generation tool, a random instruction sequence based on said test template, execute said instruction sequence by a hardware exerciser, in the integrated circuit, and compare results of said instruction sequence with said at least partial predicted results, to verify a function of said integrated circuit.

There is further provided, in an embodiment, a computer program product comprising a non-transitory computer-readable storage medium having program instructions embodied therewith, the program instructions executable by at least one hardware processor to: access a database associated with a test template, wherein said test template is configured to test a selected function of the integrated circuit; store, in said database, data corresponding to at least partial predicted results of one or more random instruction sequences generated based on said test template; generate, by an automated test generation tool, a random instruction sequence based on said test template; execute said instruction sequence by a hardware exerciser, in the integrated circuit; and compare results of said instruction sequence with said at least partial predicted results, to verify a function of said integrated circuit.

In some embodiments, said at least partial predicted results are related to interrupt instructions.

In some embodiments, said at least partial predicted results are related to load and store instructions.

In some embodiments, said at least partial predicted results are related to and exception translations.

In some embodiments, said comparing comprises accessing, by said exerciser, said at least partial predicted results, and wherein said accessing has a constant execution time.

In some embodiments, said integrated circuit is selected from the group consisting of a microprocessor, a multiprocessor system, a Central Processing Unit (CPU), a bus-bridge, a Digital Signal Processor (DSP), and a direct memory access (DMA) controller.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
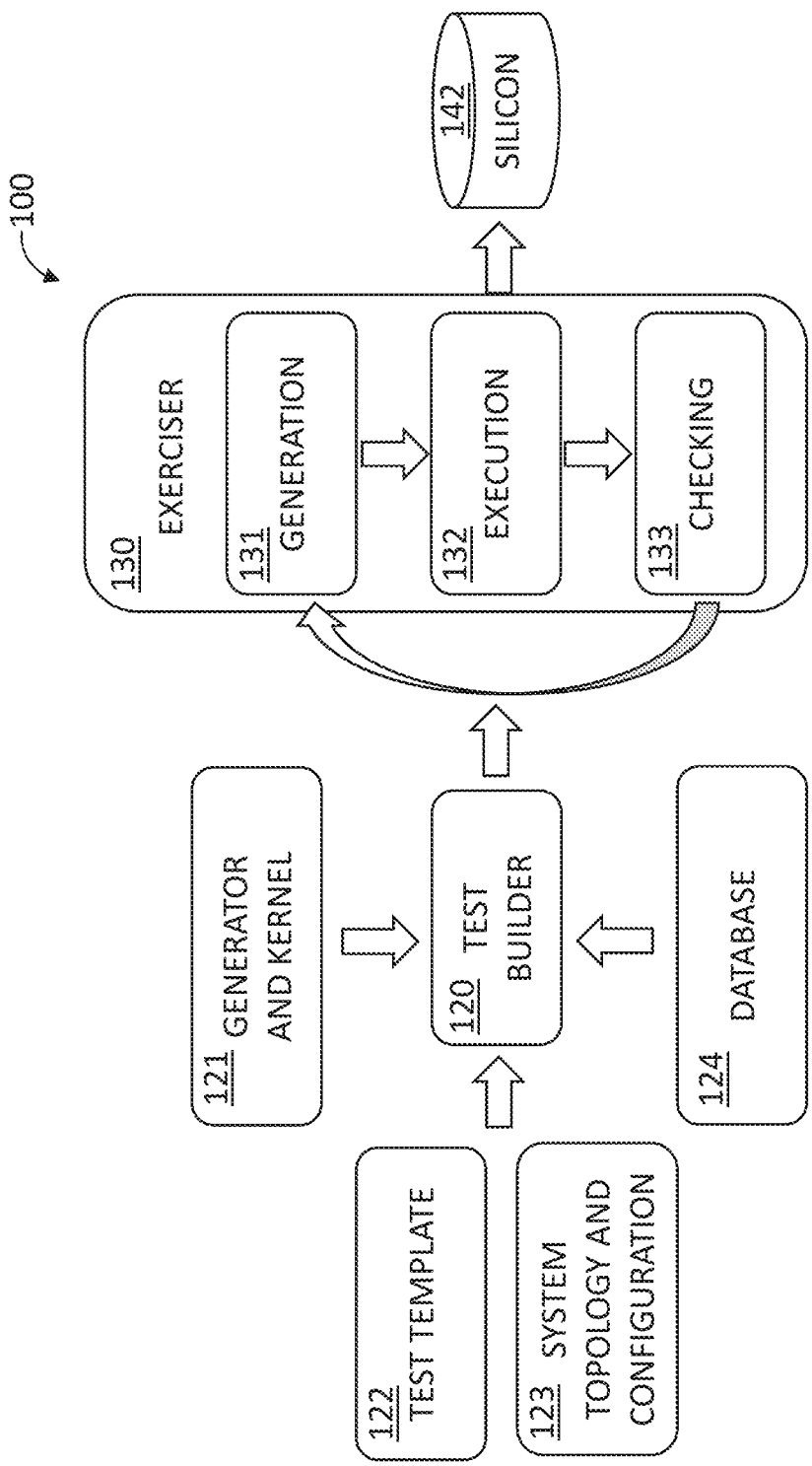
FIG. 1 is a schematic block diagram illustration of a system, in accordance with an embodiment.

Disclosed herein are a system, method, and computer program product which provide for a hardware exerciser for processors and multiprocessor systems, with an objective of finding and recreating functional failures ('bugs'). In some embodiments, an exerciser of the present disclosure may be particularly suited for post-silicon testing, although embodiments of the invention are not limited in this respect.

In some embodiments, an exerciser of the present disclosure may be designed to run on a multi-processor and/or multi-threaded system.

In some embodiments, the exerciser may be a 'bare-metal' tool, in the sense that it does not rely on operating system facilities, and can be loaded and run, standalone, on the testing environment (e.g., a simulator, hardware accelerator, or silicon) and 'exercise' the design by testing scenarios directly on it. In some embodiments, a continuous, iterative process of generating, running, and checking the validity of random biased test programs exercises the design being tested. The generated test programs may be structured according to a test template, which may be user-defined.

A non-limiting list of hardware exercisers having features in accordance with embodiments of the invention includes: Exercisers designed to target instruction-architecture based processors, including multithreading and multiprocessor systems; Exercisers applicable to hardware accelerators, emulators, and post-silicon test platforms such as hardware prototypes and production wafers; Exercisers utilizing a biased random generation scheme, to generate and run tests on the verified platform; Exercisers adapted for execution on a bare-silicon environment with no OS present and unrestricted machine access; Exercisers adapted to use a self-check method, e.g., reference-model, consistency between runs, or test-specific checks; Exercisers adapted to use a test-specific validation mechanism specified in the test-template; Exercisers adapted to include user direction through a test-template, e.g., per-thread; Exercisers that deploy an extensive test-template language as a prime method to direct the random creation of the test programs; Exercisers that are generic and/or model-based, e.g., adapted to use an external model of the architecture, a testing-knowledgebase, and a system-configuration and topology description as an input.

In some embodiments, the present disclosure provides for efficient creating of tests for checking of data and interrupts, by including, at a test generation stage, information on expected behavior of the test-case (e.g., partial expected results), that will predict interrupt occurrence and/or test-case results. In some embodiments, the present disclosure further provides for a method to efficiently convey test information between the generation stage and the checking stage.

When checking for interrupts, in the case of consistent interrupts, such as an alignment interrupt, a multi-pass consistency check is typically used. The drawback of this approach is that it cannot expose permanent bugs, when an interrupt is always missed, or always appears without a reason. Many interrupt related mechanisms are system level and cannot be verified at the pre-silicon stage. The probability of discovering persistent bugs in interrupt handling at the post-silicon stage is much higher than the probability of discovering such bugs in core verification. There is also a possibility of consistently missing interrupts, which will be eventually exposed. However, early detection is important, because it can help to make debugging much easier.

Accordingly, in some embodiments, methods and systems according to the present disclosure provide for at least partial expected results that are able to foresee whether an interrupt will occur, and at least partially predict test-case results. In some embodiments, in order to check if an interrupt occurrence is valid, suitable checks may be added to the interrupt handler. In some embodiments, to check that no interrupt occurred when not called for, a check may be added at the end of the test.

As used herein, the terms "interrupt handler" or "interrupt service routine" (ISR) refer to a special block of code associated with a specific interrupt condition. Interrupt handlers may be initiated by hardware interrupts, software interrupt instructions, or software exceptions, and are used for implementing device drivers or transitions between protected modes of operation, such as system calls.

For certain types of interrupts, there are simple rules that define whether an interrupt will occur, based on the information available at the generation stage. For example, if a test exerciser generates a privileged instruction for a test case that will be executed at a non-privilege state, that instruction will cause a privilege interrupt. For such cases, information may need to be stored so it is available at the execution and/or at the checking stages.

For various kinds of Inconsistent exceptions, for example translation-related exceptions such as page-fault or protection exception, the occurrence of an exception depends on the out-of-order execution of the test-case. The term 'inconsistent exception' may refer to an exception which may not repeat when the same test is executed more than once. For this case, a thread that modifies a translation entry will also mark that entry as being modified to trigger an interrupt. When an interrupt occurs, the exception handler will validate that an exception was caused by an entry that was marked as modified. However, without additional synchronization, this checking can only discover cases where an exception happens without a reason. A case of self-modification does not need additional synchronization, and enables even tighter checking.

Reference is made to FIG. 1, which schematically illustrates a system 100 for verification of a hardware system-under-test in accordance with an exemplary embodiment of the invention. A non-limiting list of hardware designs-under-test includes, for example, electronic circuits such as a microprocessor, a multiprocessor system, a Central Processing Unit (CPU), a Digital Signal Processor (DSP), a bus-bridge, a direct memory access (DMA) controller, an integrated circuit, or the like.

System 100 may be logically separated into, e.g., a building environment and a testing environment. In the building environment, a test builder 120 takes various user directives and produces a corresponding code image of an exerciser 130 in the testing environment, which can then be loaded and run on, e.g., system-under-test 142, or otherwise an emulator and/or a test platform which may include, e.g., an accelerator, a hardware prototype, and/or a silicon wafer.

To perform the build process and produce the exerciser, test builder 120 may rely on input from one or more modules such as test template 122, a system topology and configuration module 123, and database 124. Test builder 120 may also compile data and/or code from generator and kernel module 121 into exerciser 130. The building environment may optionally be implemented or may operate, for example, using a computing system, such as, for example, a computer, a personal computer (PC), a server computer, a computing device, a computing platform, a client/server system, a mobile computer, a portable computer, a laptop computer, a notebook computer, a tablet computer, or the like. The computing system may include, for example, one or more processors, a system bus, a memory unit, a storage unit, an input unit, an output unit, and a communication unit. The computing system may optionally include other suitable hardware components and/or software components.

In some embodiments, generator and kernel module 121 may include code to allow exerciser 130 to perform a test cycle of generation 131, execution 132, and checking 133. Generator and kernel module 121 may further include code to provide, e.g., light operating system (OS) services for the exerciser 130, such as loading the image, context switching, various system queries, and the like. In some embodiments, the system and method described herein is adapted to check the design of the system-under-test in a pure 'bare metal' form by running the test cycle 131, 132, 133 directly on the tested system, including both the generation and the testing. As used herein, the term 'bare metal' refers to execution having direct unrestricted machine access without an intervening operating system.

Test template 122 allows specifying a desired test structure. The test template is defined in a context-free formal language and includes biasing directives to influence at least one of: a desired test structure, one or more resources to be included in the test, and one or more values of the included resources. For example, test template 122 may specify a load instruction, and exerciser 130, when generating a test according to the template, may randomly select a specific load form, registers, memory address, and data to be used by the load instruction. The biasing directives may also influence the occurrence of specific architectural or microarchitectural events during test execution 132. Further, many of these random decisions may be biased towards values that are more interesting for verification purposes. In some embodiments, the biasing directives may also influence activation of the testing knowledge included in database 124.

In some embodiments, the instruction stream may include a description of the number of instructions or cycles, of instruction groups, of participating instructions, of repeated template-blocks, of alternative template blocks for selection, of relative weights for the selection alternatives, of loops, branches, and/or macros, and the like. In some embodiments, the instruction stream description may be provided as a per-thread specification. The biasing and instruction-level templates may include a description of, for example, an instruction-field specification and constraints over the instruction fields, desired architectural or micro-architectural events such as exceptions or interrupts, limiting of undesired interrupts or other events, resource interdependency including specific registers, addresses, and/or cache lines to be accessed or avoided, locality of accesses depending on configuration, control of floating-point register data, and the like. The optional validation method specification may include, for example, a validation routine that checks a predictable aspect that is specific to the test-programs generated from the template. In accordance with embodiments of the invention, the test template may express the above information in a relatively compact manner.

Optionally, system topology and configuration module 123 may provide information to test builder 120 regarding the system structure to be tested. For example, this may include information regarding the number of nodes, cores, processors, and/or active threads, processor clustering information, available memory per cluster, and the like.

Database 124 may include a formal description of the verified architecture for which the exerciser is needed, as well as heuristics for testing desired aspects of the system-under-test, e.g., in the form of a formal declarative description, or code and template libraries that can be incorporated into the generated tests. In some embodiments, the model is available to users for both reading and updating and enables the user to create an instance of the tool, e.g., using test builder 120, that is appropriate to the tested architecture. Accordingly, exerciser 130 may be a model-based exerciser built in an architecture-independent manner and that receives relevant information about the architecture from an external model, e.g., from architectural database 124. The model includes a declarative description of the architecture, as well as architecture-specific expert testing knowledge.

In some embodiments, database 124 may hold details that are required for generating valid, high-quality test-programs. Database 124 may include system hierarchy rules, instruction-types, resource-initialization rules, and any architecture- or implementation-dependent testing-knowledge and biasing option provided to the user. For example, such a model may be created per implementation of a processor-based hardware system.

In some embodiments, database 124 may be defined using a specialized hierarchy of modeling building blocks that establishes a modeling terminology for the test-program-generation problem. For example, database 124 may be defined using a type definition language where each type represents an abstract concept or a target domain class. An ontology-based model describing a specific design, e.g., architectural database 124, may then be developed by refining the pre-defined building blocks such as, e.g., Instruction, Operand, Resource, and Address, thereby creating the knowledgebase that drives the generation engine. For example, an instruction may be modeled at the semantic-level of the processor architecture by listing its operands and specifying their inter-relations. Each operand may be composed of attributes that describe the properties of the operand, and the values they may accept as input, for example: Resource, Address, Data, Sense, NumberOfUnits, Suboperands. Additional relations may describe how semantic entities (e.g., Address) are tied to the syntactic entities (e.g., machine-code fields).

In some embodiments, database 124 may include a description of the design to be tested, its expected behavior, and expert testing knowledge regarding the design. For example, testing-knowledge heuristics may be modeled through data-classification or data-types, constraints and generation-functions that influence generation decisions (which may be controlled by the user through test-template 122), and fine-tuning of the generation scheme through biasing weights and default values.

In accordance with embodiments of the invention, builder module 120 compiles inputs from modules 121, 122, 123, and 124 to produce an executable image and/or exerciser image. Exerciser 130 incorporates a compact representation, e.g., in a memory device, of the main inputs described above. For example, exerciser 130 may include embedded data representing architectural knowledge and testing knowledge of the system-under-test, the topology and configuration setup for the system-under-test, and the test template. Test builder 120 may optimize a size of hardware exerciser 130 by selecting only a relevant portion of architectural model and of said testing database 124 to include in the embedded data.

In the testing environment, an image of exerciser 130 may be loaded onto a test platform, such as, for example, system-under-test 142. Exerciser 130, supported by minimal OS services, may then control a test cycle including generation 131, execution 132, and checking 133 of random-biased generated tests.

Generation 131 may follow a scheme provided by the test template data to generate any number of random tests that satisfy the template. Any aspect of the test that is not decided by the test-template (e.g., left unspecified or just partially constrained) may be randomly decided by the generation scheme. The random decisions should satisfy the test-template constraints specified in template data and the architectural constraints In the case of a multithreaded processor or a multiprocessor system, tests may be generated either by a monarch thread or in a distributed process where each thread generates its own test program. In some embodiments, only a distributed process may be used, because it may provide for scalability. Where a test is generated per-thread, the tests may be based on different requested test templates.

Checking 133 may follow any suitable validation routine or method. A non-limiting list of checking methods for use in accordance with embodiments of the invention includes hardware-implemented traps, a multi-pass approach, a dual-pass approach, comparing test results to a reference model, checking for specific predictable results, and the like. For example, in some embodiments test template 122 may include the results to be verified.

A dual pass checking method may include executing each generated test twice, recording the results of the executions, and comparing for consistency. In some embodiments, a multi pass checking comprises executing each generated test a plurality of times, and comparing results for consistency.

In one example, the two executions 133 may be set to differ only in their respective micro-architecture scheduling. In some embodiments, a multiple test pass variation may be used. The passes may be scheduled with random delays or in a synchronized lock-step mode. In one example, a reference pass may be executed in trace mode to provide additional accuracy. Additionally or alternatively, an external monitoring mechanism may be implemented.

Figure 2:
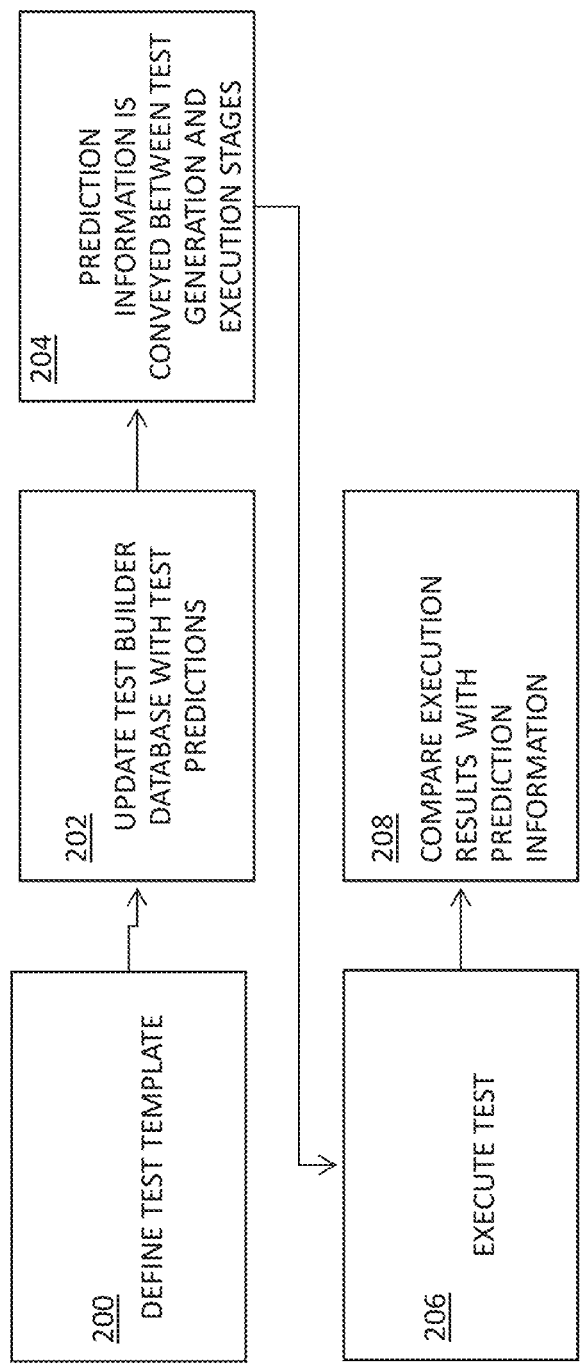
FIG. 2 is a flowchart of the functional steps in a method for post-silicon testing utilizing at least partial test results, in accordance with an embodiment.

FIG. 2 is a flowchart of the functional steps in a method for post-silicon testing utilizing at least partial test results. In some embodiments, the present process may also be applied to other environments, such as emulation and acceleration.

At a step 200, a test may be defined for directing a randomly-generated test of the hardware system-under-test. In some embodiments, the test template may include biasing directives to influence, for example, a desired test structure, one or more resources of the system-under-test to be included in the test, and/or one or more values of the included resources.

At a step 202, a database used by the test builder, such as database 124 in FIG. 1, may be updated. For example, the database may include architectural knowledge of the silicon being tested, as well as testing knowledge. In some embodiments, the architectural knowledge is obtained from an architectural model including a formal description of the specification for the system-under-test, and the testing knowledge is obtained from a testing knowledge base including heuristics for testing desired aspects of the system-under-test.

In some embodiments, database 124 may be updated with information to be used, e.g., for exception, data, and context prediction. As noted above, for certain types of interrupts there are simple rules that define whether an interrupt will occur, based on the information available at the generation stage. For example, if an exerciser generates a privileged instruction for a test case that will be executed at a non-privilege state, that instruction will cause a privilege interrupt. For such cases, this information may be stored in database 124, so it is available for comparison purposes at the execution or checking stages. For example, privileged instructions in database 124 may be suitably marked. Because, at generation step 131, the test-case execution mode is known, there can be predicted whether an instruction will cause a privilege exception. Similarly, because for load/store instructions, at generation step 131 the memory access address and machine state are known, adding an instruction length to the database allows to predict whether an instruction will cause an alignment exception. For example, in some embodiments, the present disclosure provides for creating 'isolated instructions' for test-case results, which may uniquely use some system resources, such as general-purpose registers (GPR). For example, "add r11, r10, r9" may be added as an instruction to, e.g., GPR9, GPR10, GPR11, because it is the only instruction in these registers. Thus, a prediction may be added on the final value of GPR11, according to the initial values of GPR9 and GPR10.

In some embodiments, at a step 204, the present disclosure further provides for a method to efficiently convey the information between the generation stage and the checking stage with O(1) complexity.

In some embodiments, to convey the information between the generation stage and the checking stage, a set of memory entries may be allocated where each entry corresponds to a different exception. Each entry can then be marked as, e.g., "must occur," "must not occur," or "not known."

In some embodiments, for efficient information retrieval, the following property may be used: At generation time, the exerciser knows the instruction's effective address. During test execution, the system-under-test provides the same effective address to the exception handler, which enables effective checking. The test generator may then choose either to write down the entry at a fixed offset, or use a hash of this EA as an index into an auxiliary data structure. Then, the exception handler can easily access the information stored at generation time with O(1).

In some embodiments, a similar approach may be applicable to the translation related exceptions. In this case, a thread performing modification can store additional information in the SW bits of the translation entry itself. The exception handler, in addition to updating the entry itself, will also perform checking based on the additional information stored in the SW bits.

In some embodiments, this database can add information on data values in system resources, that can be asserted after specific instructions.

At a step 206, the generated test, may be executed by exerciser 130 in FIG. 1.

At a step 208, the results of the executed test may be compared to the predicted results to validate the system-under-test.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing an integrated circuit, comprising:
   accessing a database associated with a test template, wherein said test template is configured to test a selected function of the integrated circuit;
   storing, in said database, data corresponding to at least partial predicted results of one or more random instruction sequences generated based on said test template;
   generating, by an automated test generation tool, a random instruction sequence based on said test template;
   executing said instruction sequence by a hardware exerciser, in the integrated circuit; and
   comparing results of said instruction sequence with said at least partial predicted results, to verify a function of said integrated circuit, wherein said comparing comprises accessing, by said exerciser, said at least partial predicted results, and wherein said accessing has a constant execution time.

2. The method of claim 1, wherein said at least partial predicted results are related to interrupt instructions.

3. The method of claim 1, wherein said at least partial predicted results are related to load and store instructions.

4. The method of claim 1, wherein said at least partial predicted results are related to and address translations.

5. The method of claim 1, wherein said integrated circuit is selected from the group consisting of: a microprocessor, a multiprocessor system, a Central Processing Unit (CPU), a bus-bridge, a Digital Signal Processor (DSP), and a direct memory access (DMA) controller.

6. A system for testing an integrated circuit, comprising:
   at least one hardware processor; and
   a non-transitory computer-readable storage medium having stored thereon program instructions, the program instructions executable by the at least one hardware processor to:

access a database associated with a test template, wherein said test template is configured to test a selected function of the integrated circuit, store, in said database, data corresponding to at least partial predicted results of one or more random instruction sequences generated based on said test template, generate, by an automated test generation tool, a random instruction sequence based on said test template, execute said instruction sequence by a hardware exerciser, in the integrated circuit, and compare results of said instruction sequence with said at least partial predicted results, to verify a function of said integrated circuit, wherein said comparing comprises accessing, by said exerciser, said at least partial predicted results, and wherein said accessing has a constant execution time.

7. The system of claim 6, wherein said at least partial predicted results are related to interrupt instructions.

8. The system of claim 6, wherein said at least partial predicted results are related to load and store instructions.

9. The system of claim 6, wherein said at least partial predicted results are related to and address translations.

10. The system of claim 6, wherein said integrated circuit is selected from the group consisting of: a microprocessor, a multiprocessor system, a Central Processing Unit (CPU), a bus-bridge, a Digital Signal Processor (DSP), and a direct memory access (DMA) controller.

11. A computer program product comprising a non-transitory computer-readable storage medium having program instructions embodied therewith, the program instructions executable by at least one hardware processor to:

access a database associated with a test template, wherein said test template is configured to test a selected function of the integrated circuit;

store, in said database, data corresponding to at least partial predicted results of one or more random instruction sequences generated based on said test template;

generate, by an automated test generation tool, a random instruction sequence based on said test template;

execute said instruction sequence by a hardware exerciser, in the integrated circuit; and compare results of said instruction sequence with said at least partial predicted results, to verify a function of said integrated circuit, wherein said comparing comprises accessing, by said exerciser, said at least partial predicted results, and wherein said accessing has a constant execution time.

12. The computer program product of claim 11, wherein said at least partial predicted results are related to interrupt instructions.

13. The computer program product of claim 11, wherein said at least partial predicted results are related to load and store instructions.

14. The computer program product of claim 11, wherein said at least partial predicted results are related to and address translations.

15. The computer program product of claim 11, wherein said integrated circuit is selected from the group consisting of: a microprocessor, a multiprocessor system, a Central Processing Unit (CPU), a bus-bridge, a Digital Signal Processor (DSP), and a direct memory access (DMA) controller.

* * * * *